United States Patent
Kojima

(10) Patent No.: US 11,878,929 B2
(45) Date of Patent: Jan. 23, 2024

(54) MANUFACTURING APPARATUS AND MANUFACTURING METHOD OF POROUS GLASS BASE MATERIAL

(71) Applicant: Shin-Etsu Chemical Co., Ltd., Tokyo (JP)

(72) Inventor: Hiroki Kojima, Chiba-ken (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 140 days.

(21) Appl. No.: 17/501,512

(22) Filed: Oct. 14, 2021

(65) Prior Publication Data
US 2022/0127181 A1    Apr. 28, 2022

(30) Foreign Application Priority Data
Oct. 26, 2020    (JP) ................. 2020-179250

(51) Int. Cl.
*C03B 19/14*    (2006.01)

(52) U.S. Cl.
CPC ...... *C03B 19/1423* (2013.01); *C03B 19/1484* (2013.01); *C03B 2201/31* (2013.01); *C03B 2207/70* (2013.01)

(58) Field of Classification Search
CPC .............. C03B 19/1415–1423; C03B 2207/70
See application file for complete search history.

(56) References Cited

FOREIGN PATENT DOCUMENTS

| JP | 2000211929 A | * | 8/2000 | ....... C03B 37/01413 |
| WO | WO-2016111250 A1 | * | 7/2016 | ....... C03B 37/01413 |

OTHER PUBLICATIONS

JP 2000-211929 A (Hirasawa et al.) Aug. 2, 2000 (English language machine translation). [online] [retrieved Jun. 13, 2023]. Retrieved from: Espacenet. (Year: 2000).*
WO 2016/111250 A1 (Takahashi) Jul. 4, 2016 (English language machine translation). [online] [retrieved Jun. 13, 2023]. Retrieved from: Espacenet. (Year: 2016).*

* cited by examiner

*Primary Examiner* — Erin Snelting
(74) *Attorney, Agent, or Firm* — Greenblum & Bernstein, P.L.C.

(57) ABSTRACT

A manufacturing apparatus of porous glass base material includes deposition apparatuses that manufacture a porous glass base material by generating raw material particles from vaporized raw material compounds in an oxyhydrogen flame, and then depositing the generated raw material particles on a rotating starting material. The manufacturing apparatus includes a storage container that stores liquid raw material compounds for each compound, a vapor generation mechanism that vaporizes the raw material compounds, and a gas channel that supplies the vaporized raw material compounds to the deposition apparatuses. The gas channel includes a common gas channel shared to supply vaporized raw material compounds to the plurality of deposition apparatuses, and individual gas channels branched off from the common gas channel to supply vaporized raw material compounds to each of the deposition apparatuses individually. Each of the individual gas channels has a flow controller, a steam valve, and a valve.

4 Claims, 1 Drawing Sheet

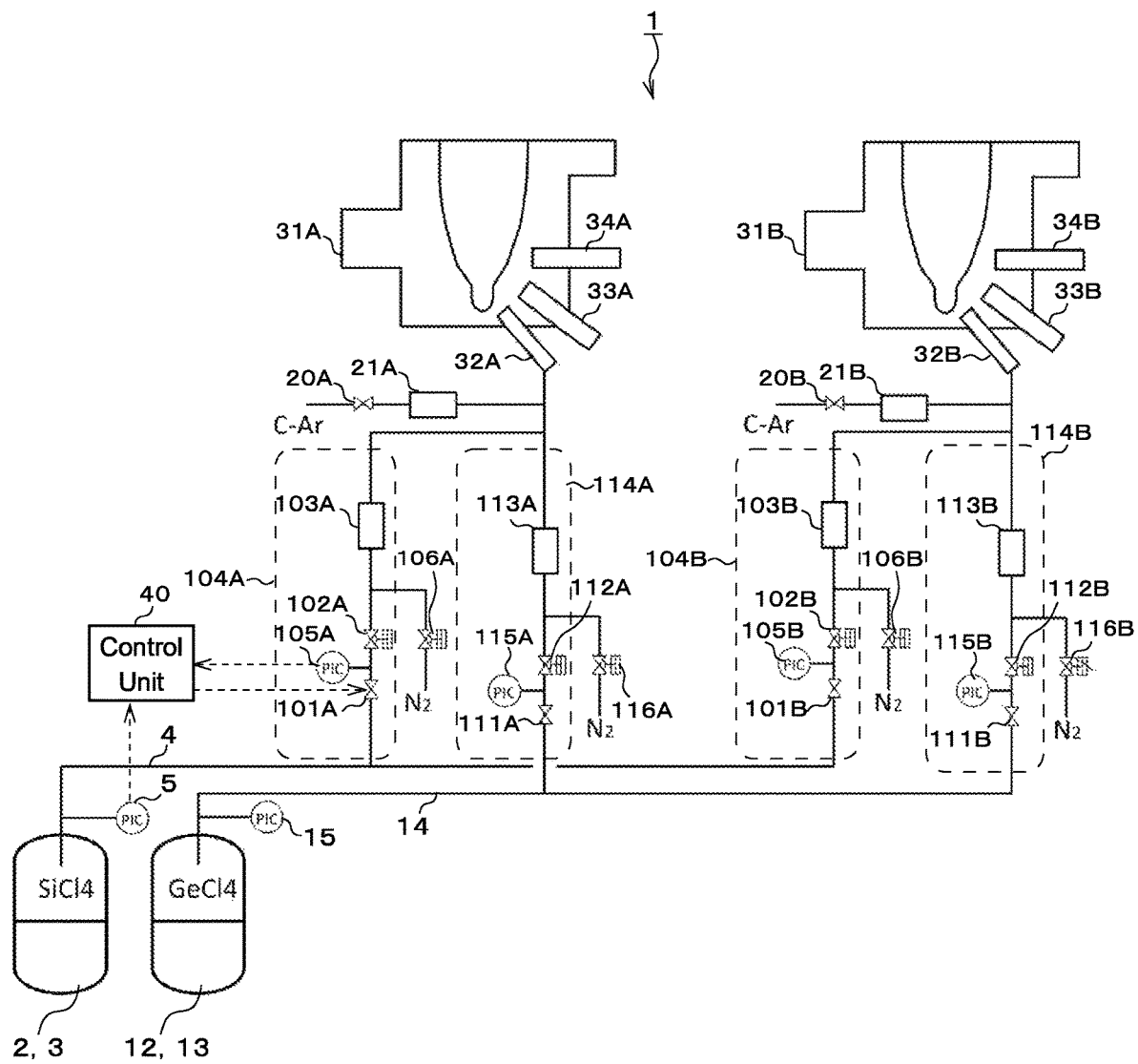

MANUFACTURING APPARATUS AND MANUFACTURING METHOD OF POROUS GLASS BASE MATERIAL

CROSS-REFERENCE TO RELATED APPLICATION

This non-provisional application claims priority under 35 U.S.C. § 119(a) from Japanese Patent Application No. 2020-179250, filed on Oct. 26, 2020, the entire contents of which are incorporated herein by reference.

BACKGROUND

Technical Field

The present invention relates to a method and apparatus for manufacturing a porous glass base material. In particular, the invention relates to a manufacturing apparatus and a manufacturing method characterized by the suppression of striae in the porous glass base material due to pressure fluctuations of the vaporized gas.

Background Art

Various methods have been proposed to produce a base material for optical fiber. In the VAD method, which is a well-known method, the starting material is attached to a shaft that rises while rotating and is hung down in a reaction chamber. The core deposition burner and the cladding deposition burner, which are installed in the reaction chamber at a predetermined angle to the axial direction of the starting material, deposit the generated glass particles on the tip of the starting material to produce a porous glass base material consisting of core and cladding layers.

The porous glass base material thus produced is dehydrated and sintered in a heating furnace equipped with a sealable furnace core tube, an electric furnace that heats part or almost all of the furnace core tube, a gas inlet port for introducing any gas into the furnace core tube, and a gas outlet port for discharging the gas from the furnace core tube. Dehydration is performed by heating the porous glass base material to about 1,100° C. in a dehydration gas consisting of, for example, chlorine, oxygen, argon, and helium. Vitrification is performed by heating the porous glass base material to about 1,500° C. in a helium atmosphere. During dehydration and vitrification, for example, the porous glass base material is pulled down from top to bottom and passed through the heating area of the electric furnace for dehydration and vitrification.

In a structure in which raw material gas is supplied from one vapor generation mechanism to multiple VAD apparatus, due to an overlap of the timing of the start or end of manufacturing of multiple apparatus or liquid replenishment in the vapor generation mechanism may cause pressure fluctuations in the vaporized gas channel, resulting in large fluctuations in the vaporized gas flow rate, which may cause trouble with striae in the porous glass base material.

SUMMARY OF THE INVENTION

Problems to be Solved by the Invention

The present invention has been made in view of the above situation, and it is an object of the present invention to provide an apparatus for manufacturing a porous glass base material and a manufacturing method that can suppress the striae caused by fluctuations in the vaporized gas flow rate.

Means for Solving the Problems

To solve the above problem, a manufacturing apparatus according to the present invention includes a plurality of deposition apparatuses that manufacture porous glass base material by generating raw material particles from vaporized raw material compounds in an oxyhydrogen flame and then depositing the generated raw material particles on a rotating starting material. The manufacturing apparatus includes at least one storage container that stores liquid raw material compounds for each compound, at least one vapor generation mechanism that vaporizes the raw material compounds in the storage container, and at least one gas channel that supplies the raw material compounds vaporized by the vapor generation mechanism to a plurality of deposition apparatuses. The gas channel includes a common gas channel that is shared to supply vaporized raw material compounds to the plurality of deposition apparatuses, and a plurality of individual gas channels that are branched off from the common gas channel to supply vaporized raw material compounds to each of the deposition apparatuses individually. Each of the plurality of individual gas channels has a flow controller that controls the flow rate of the vaporized raw material compound, a steam valve that controls the on/off (opening/shutting) of the vaporized raw material compound distribution, and a valve that is provided upstream from the flow controller and can adjust flow channel cross-section area.

The manufacturing apparatus of the present invention may further include a control unit that adjusts the opening of the valves provided in the individual gas channels so that the pressure downstream of each of the valves in the individual gas channels is 60-95% of the pressure of the vaporized raw material compound in the vapor generation mechanism.

In the present invention, the raw material compound may be a silicon compound and/or a compound for doping. The compound for doping may be a germanium compound.

The manufacturing method of porous glass base material according to the present invention is characterized in that, in the manufacturing apparatus of any of the above, the opening of the valve is adjusted so that the pressure downstream of the valve is 60-95% of the pressure of the vaporized raw material compound in the vapor generation mechanism.

BRIEF DESCRIPTION OF THE DRAWINGS

FIG. 1 shows an overall view of the manufacturing apparatus.

DETAILED DESCRIPTION OF THE EMBODIMENTS

The silica glass porous glass base material according to the present invention is manufactured, for example, by the manufacturing apparatus 1 shown in FIG. 1.

The manufacturing apparatus 1 includes two VAD apparatuses (31A, 31B). The VAD apparatuses (31A, 31B) are a type of deposition apparatus that manufactures porous glass base material by generating raw material particles from vaporized raw material compounds in an oxyhydrogen flame and then depositing the generated raw material particles on a rotating starting material. The raw material compound in the manufacturing apparatus 1 includes a silicon compound and a compound for doping (doping agent). The compound for doping may be a germanium compound, for example.

The manufacturing apparatus 1 includes storage containers (2, 12) that store the aforementioned raw material compounds in liquid form for each compound. The storage container 2 stores $SiCl_4$ as a silicon compound. The storage container 12 stores $GeCl_4$ as the doping agent.

The manufacturing apparatus 1 includes vapor generation mechanisms (3, 13) that vaporize the raw material compounds in the storage containers. The vapor generation mechanism 3 is provided in correspondence with the storage container 2. The vapor generation mechanism 3 vaporizes the $SiCl_4$ stored in the storage container 2 and supplies the vaporized gas to the two VAD apparatuses (31A, 31B). The vapor generation mechanism 13 is provided in correspondence with the storage container 12. The vapor generation mechanism 13 vaporizes the $GeCl_4$ stored in the storage container 12 and supplies the vaporized gas to the two VAD apparatuses (31A, 31B).

In the present embodiment, a configuration with two VAD apparatuses (31A, 31B) connected is described as an example, but more VAD apparatuses may be connected. In the present embodiment, two sets of storage containers and vapor generation mechanisms are provided, one for the silicon compound and the other for the doping agent, but any one of these sets may be used, or three or more sets may be provided.

The manufacturing apparatus 1 includes gas channels that supply the raw material compounds vaporized by the vapor generation mechanisms (3, 13) to the VAD apparatuses (31A, 31B). In the present embodiment, the manufacturing apparatus 1 includes gas channels (4, 104A, 104B) for a silicon compound ($SiCl_4$) and gas channels (14, 114A, 114B) for a compound for doping ($GeCl_4$). A pressure indicating controllers are provided in the gas channels to measure the pressure of the gas at the installation locations. Hereafter, the pressure indicating controller is abbreviated as PIC.

The gas channel includes a common gas channel (4, 14) that is shared to supply vaporized raw material compounds to the plurality of VAD apparatuses, and a plurality of individual gas channels (104A, 104B, 114A, 114B) that are branched off from the common gas channel to supply vaporized raw material compounds to each of the VAD apparatuses (10A, 10B) individually. Each of the individual gas channels (104A, 104B, 114A, 114B) has a flow controller (mass flow controller; 103A, 103B, 113A, 113B) that controls the flow rate of the vaporized raw material compound, a steam valve (102A, 102B, 112A, 112B) that controls the on/off (opening/shutting) of the vaporized raw material compound distribution, a valve (101A, 101B, 111A, 111B) that is provided upstream from the flow controller and can adjust flow channel cross-section area, and a PIC (105A, 105B, 115A, 115B) that measures the pressure downstream from the valve.

The $SiCl_4$ gas vaporized by the vapor generation mechanism 3 is supplied to the VAD apparatuses (31A, 31B). The PICs (105A, 105B) that measure the pressure of the $SiCl_4$ gas vaporized by the vapor generation mechanism 3 are installed in the common gas channel 4 of the gas channel that supplies $SiCl_4$ gas. Individual gas channels (104A, 104B) branch off from the common gas channel 14 toward the VAD apparatuses (31A, 31B). The $SiCl_4$ gas directed to the VAD apparatus 31A is sent to the core forming burner 32A through the individual gas channel 104A, the valve 101A, the PIC 105A, the steam valve 102A, and the flow controller (mass flow controller; 103A). Similarly, the $SiCl_4$ gas directed to the VAD apparatus 31B is sent to the core forming burner 32B through the individual gas channel 104B, the valve 101B, the PIC 105B, the steam valve 102B, and the flow controller 103B. The gas channel introducing inert gas may be connected between the steam valve (102A, 102B) and the flow controller (103A, 103B), and the steam valve (102A, 102B) and a steam valve (106A, 106B) installed in the gas channel introducing inert gas may be turned on/off (open/shut) so that when one is open, the other is shut off. Thereby the vaporized gas may be introduced into the flow controller (103A, 103B) during production, and inert gas may be introduced when production is stopped.

The $GeCl_4$ gas vaporized by the vapor generation mechanism 13 is supplied to the VAD apparatuses (31A, 31B) as the second component. The PICs (115A, 115B) that measure the pressure of the $GeCl_4$ gas vaporized by the vapor generation mechanism 13 are installed in the common gas channel 14 of the gas channel that supplies the $GeCl_4$ gas. Individual gas channels (114A, 114B) branch off from the common gas channel 14 toward the VAD apparatuses (31A, 31B). The $GeCl_4$ gas directed to the VAD apparatus 31A is sent to the core forming burner 32A through the individual gas channel 114A, the valve 111A, the PIC 115A, the steam valve 112A, and flow controller 113A. Similarly, the $GeCl_4$ gas directed to the VAD apparatus 31B is sent to the core forming burner 32B through the valve 111B, the PIC 115B, the steam valve 112B, and the flow controller 113B. The gas channel introducing inert gas may be connected between the steam valve (112A, 112B) and the flow controller (113A, 113B), and the steam valve (112A, 112B) and a steam valve (116A, 116B) installed in the gas channel introducing inert gas may be turned on/off so that when one is open, the other is shut off. Thereby the vaporized gas may be introduced into the flow controller (113A, 113B) during production, and inert gas may be introduced when production is stopped.

In addition, C—Ar, $N_2$, Air, etc. as the third component is sent to the VAD apparatus (31A, 31B) through a valve (20A, 20B) and a flow controller (21A, 21B). The $SiCl_4$ gas and the $GeCl_4$ gases are supplied to the core forming burners (32A, 32B) as well as cladding forming burners (33A, 33B, 34A, 34B), where they are hydrolyzed into silica particles and $GeO_2$ particles by flame hydrolysis in the oxyhydrogen flame and deposited on the rotating starting material.

Pressure fluctuation of the vaporized gases ($SiCl_4$ gas and $GeCl_4$ gas) supplied to the VAD apparatuses can be caused by liquid replenishment in the vapor generation mechanism or overlap of the timing of the start and end of manufacturing in other VAD apparatus.

The manufacturing apparatus 1 is equipped with valves (101A, 101B, 111A, 111B) upstream from the flow controllers (103A, 103B, 113A, 113B) in the supply channel of the vaporized gas, and intentionally causes pressure loss by adjusting the opening of these valves when pressure fluctuations occur. This reduces the effect of pressure fluctuations upstream of the valve on the downstream of the valve, and suppresses striae in the porous glass base material due to large fluctuations in the vaporized gas flow rate. The types of valves used can be gate valves, chuck valves, butterfly valves, globe valves, ball valves, etc.

Specifically, it is effective to adjust the pressure downstream of the valve so that it is 60-95% of the pressure of the vaporized gas (vaporized silicon compound and/or vaporized compound for doping) in the vapor generation mechanism (3, 13).

If the pressure downstream of the valve is less than 60% of the pressure of the vaporized gas in the vapor generation mechanism, the differential pressure upstream and downstream of the flow controller becomes small, and the vaporized gas may not flow at the set flow rate.

On the other hand, if the pressure downstream of the valve is more than 95% of the pressure of the vaporized gas in the vapor generation mechanism, the effect of suppressing pressure fluctuation due to pressure drop is small.

The opening of each valve may be automatically adjusted so that the pressure downstream of the valve in the individual gas channel is 60-95% of the pressure of the vaporized raw material compound in the vapor generation mechanism, depending on the pressure detected by the PIC located immediately downstream of the valve (e.g., PIC 105A for valve 101A) and the PIC located in the common ventilation channel (e.g., PIC 5 for SiCl$_4$ gas). The manufacturing apparatus 1 may be equipped with a control unit 40 to achieve such automatic adjustment. This configuration allows for precise control. FIG. 1 illustrates a configuration in which the control unit 40 automatically adjusts the opening of the valve 101A in the individual gas channel 104A of SiCl$_4$ gas to the VAD apparatus 31A, but the other valves (101B, 111A, 111B) may also be automatically adjusted by the control unit 40 in the same manner.

According to this method, the generation of striae in porous glass base material can be suppressed at low cost without large investment in plant and equipment.

Example 1

The pressure at PIC 5 was set to 0.06 MPa, and SiCl$_4$ flowed by adjusting the opening of valves (101A, 101B) so that the pressure at each of PICs (105A, 105B) of the individual gas channel was 50, 70, 80, or 98% of the pressure at the PIC 5. The flow controllers (103A, 103B) were adjusted in the range of 0 to 1200 cc/min for SiCl$_4$. Other conditions were kept the same, porous glass base materials were manufactured, and the flow rate fluctuation in the flow controller and the presence of striae in the porous base material were checked when pressure fluctuation occurred. The results are shown in Table 1.

TABLE 1

| Pressure at PIC 5 | Mpa | 0.060 | 0.060 | 0.060 | 0.060 |
|---|---|---|---|---|---|
| Pressure at PICs 105A and 105B | MPa | 0.030 | 0.042 | 0.048 | 0.059 |
| Pressure ratio | % | 50 | 70 | 80 | 98 |
| Flow rate fluctuation at the flow controller when the pressure fluctuation at PIC 5A is 0.005 Mpa | cc/min | The set flow rate is not reached. | 5 or less | 5 or less | 30 |
| Striae | — | Not found | Not found | Not found | Found |
| Is the actual flow rate in accordance with the set flow rate? | — | No | Yes | Yes | Yes |

When the pressure ratios were 70% and 80%, there was no (or very small) fluctuation in flow rate downstream of the valve even when there was pressure fluctuation upstream of the valve, and no striae was found.

On the other hand, when the pressure ratio was 50%, the SiCl$_4$ flow rate did not reach the set flow rate, and the target optical properties could not be obtained.

When the pressure ratio was 98%, the SiCl$_4$ flow rate in the flow controller fluctuated, and striae were formed in the porous glass base material.

Example 2

The pressure at PIC 15 was set to 0.06 MPa, and GeCl$_4$ flowed by adjusting the opening of valves (111A, 111B) so that the pressure at each of PICs (115A, 115B) of the individual gas channel was 50, 70, 80, or 98% of the pressure at the PIC 15. The flow controllers (113A, 113B) were adjusted in the range of 0 to 50 cc/min for GeCl$_4$. Other conditions were kept the same, porous glass base materials were manufactured, and the flow rate fluctuation in the flow controller and the presence of striae in the porous base material were checked when pressure fluctuation occurred. The results are shown in Table 2.

TABLE 2

| Pressure at PIC 15 | Mpa | 0.060 | 0.060 | 0.060 | 0.060 |
|---|---|---|---|---|---|
| Pressure at PICs 115A and 115B | MPa | 0.030 | 0.042 | 0.048 | 0.059 |
| Pressure ratio | % | 50 | 70 | 80 | 98 |
| Flow rate fluctuation at the flow controller when the pressure fluctuation at PIC 15 is 0.005 Mpa | cc/min | The set flow rate is not reached. | 0.1 or less | 0.1 or less | 0.6 |
| Striae | — | Not found | Not found | Not found | Found |
| Is the actual flow rate in accordance with the set flow rate? | — | No | Yes | Yes | Yes |

When the pressure ratios were 70% and 80%, there was no fluctuation in flow rate downstream of the valve even when there was pressure fluctuation upstream of the valve, and no striae was found.

On the other hand, when the pressure ratio was 50%, the GeCl$_4$ flow rate did not reach the set flow rate, and the target optical properties could not be obtained.

When the pressure ratio was 98%, the GeCl$_4$ flow rate in the flow controller fluctuated, and striae were formed in the porous glass base material.

As explained above, the manufacturing apparatus and manufacturing method of the present invention can suppress the striae caused by fluctuations in the vaporized gas flow rate.

What is claimed is:

1. A manufacturing apparatus of porous glass base material, including a plurality of deposition apparatuses that manufacture a porous glass base material by generating raw material particles from vaporized raw material compounds in an oxyhydrogen flame, and then depositing the generated raw material particles on a rotating starting material, the manufacturing apparatus comprises:
    at least one storage container for storing a raw material compound in liquid form for each respective compound;
    at least one vapor generation mechanism for vaporizing the raw material compound in each storage container of the at least one storage container; and
    at least one gas channel for supplying a respective vaporized raw material compound vaporized by a respective vapor generation mechanism of the at least one vapor generation mechanism to the plurality of deposition apparatuses,
    wherein each gas channel includes:
        a common gas channel that is shared to supply respective vaporized raw material compounds to the plurality of deposition apparatuses; and
        a plurality of individual gas channels that are branched off from the common gas channel to supply respective vaporized raw material compounds to each of the deposition apparatuses individually, and wherein each of the plurality of individual gas channels includes:
a flow controller that controls a flow rate of the respective vaporized raw material compound;
a steam valve that controls an on/off distribution of the respective vaporized raw material compound; and
a valve that is provided upstream from the flow controller and can adjust a flow channel cross-section area, the manufacturing apparatus further comprising a control unit that adjusts an opening of each valve so that a pressure downstream of each valve in a respective individual gas channel of the plurality of individual gas channels is 60-95% of a pressure of the respective vaporized raw material compound in the respective vapor generation mechanism, wherein PICs are provided in the common gas channel and immediately downstream of each valve, and the openings of the valves are automatically adjusted based on a detected pressure detected by each PIC, and wherein each individual deposition apparatus produces a separate porous glass base material.

2. The manufacturing apparatus according to claim 1, wherein at least one of the raw material compounds is a silicon compound and/or a compound for doping.

3. The manufacturing apparatus according to claim 2, wherein the compound for doping is a germanium compound.

4. A manufacturing method of porous glass base material comprising, in the manufacturing apparatus according to claim 1, adjusting the opening of each valve so that the pressure downstream of each valve is 60-95% of the pressure of the respective vaporized raw material compound in the respective vapor generation mechanism.

* * * * *